(12) United States Patent
Klein et al.

(10) Patent No.: US 11,186,695 B2
(45) Date of Patent: Nov. 30, 2021

(54) METHOD FOR PRODUCING EXPANDED THERMOPLASTIC POLYMERS

(71) Applicant: Huntsman International LLC, The Woodlands, TX (US)

(72) Inventors: Alexander Rene Klein, Hoegaarden (BE); Jan Vandenbroeck, Scherpenheuvel-Zichem (BE); Maria Richard Koen Kemel, Kessel-Lo (BE); Joseph Mark Brennan, Aarschot (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 179 days.

(21) Appl. No.: 16/466,669

(22) PCT Filed: Nov. 14, 2017

(86) PCT No.: PCT/EP2017/079152
§ 371 (c)(1),
(2) Date: Jun. 5, 2019

(87) PCT Pub. No.: WO2018/104009
PCT Pub. Date: Jun. 14, 2018

(65) Prior Publication Data
US 2019/0292345 A1    Sep. 26, 2019

(30) Foreign Application Priority Data
Dec. 7, 2016    (EP) ..................... 16202626

(51) Int. Cl.
*C08J 9/12*    (2006.01)
*C08J 9/18*    (2006.01)
(Continued)

(52) U.S. Cl.
CPC .............. *C08J 9/122* (2013.01); *B01J 3/04* (2013.01); *B29C 44/3403* (2013.01);
(Continued)

(58) Field of Classification Search
CPC ... C08J 9/141; C08J 9/143; C08J 9/122; C08J 9/18; B29C 44/3453; B01J 3/04
See application file for complete search history.

(56) References Cited

U.S. PATENT DOCUMENTS 3,817,811 A    6/1974    Halberschmidt et al.
4,525,485 A *  6/1985    Maeda ............... B29C 44/3461
                                                          264/53
(Continued)

FOREIGN PATENT DOCUMENTS

CN    104987525 A    10/2015
JP    H11170288 A    6/1999
(Continued)

*Primary Examiner* — Michael M Dollinger
*Assistant Examiner* — Christina H. W. Rosebach
(74) *Attorney, Agent, or Firm* — Huntsman International LLC; Robert Diaz

(57) ABSTRACT

An improved process for fabricating expanded thermoplastic polymers (eTP) starting from non-expanded TP is disclosed whereby said process has improved thermal control, uses preferably environmentally friendly foaming gasses, avoids anisotropy and sticking of the eTP during the processing and minimises the duration of the charging step.

15 Claims, 16 Drawing Sheets

(51) Int. Cl.
  *B01J 3/04*   (2006.01)
  *C08J 9/14*   (2006.01)
  *B29C 44/34*  (2006.01)
  B29L 31/30    (2006.01)
  B29K 101/12   (2006.01)
  B29L 31/00    (2006.01)
  B29L 31/50    (2006.01)
  B29K 75/00    (2006.01)

(52) U.S. Cl.
  CPC ......... *B29C 44/3453* (2013.01); *C08J 9/141* (2013.01); *C08J 9/143* (2013.01); *C08J 9/18* (2013.01); *B29C 44/348* (2013.01); *B29K 2075/00* (2013.01); *B29K 2101/12* (2013.01); *B29K 2995/0015* (2013.01); *B29K 2995/0091* (2013.01); *B29L 2031/3005* (2013.01); *B29L 2031/50* (2013.01); *B29L 2031/712* (2013.01); *C08J 2201/032* (2013.01); *C08J 2203/06* (2013.01); *C08J 2203/08* (2013.01); *C08J 2203/14* (2013.01); *C08J 2203/142* (2013.01); *C08J 2203/162* (2013.01); *C08J 2300/22* (2013.01); *C08J 2375/04* (2013.01)

(56) References Cited

U.S. PATENT DOCUMENTS

| 2014/0272379 | A1* | 9/2014 | Watkins | B29D 35/0054 |
| | | | | 428/316.6 |
| 2014/0275306 | A1 | 9/2014 | Watkins et al. | |
| 2016/0045879 | A1* | 2/2016 | Kumar | B01J 3/02 |
| | | | | 521/50 |

FOREIGN PATENT DOCUMENTS

| JP | 2004058387 A | 2/2004 |
| RU | 2323824 C2 | 5/2008 |
| WO | 94020568 A | 9/1994 |
| WO | 2008125250 A | 10/2008 |
| WO | 2015052265 A | 4/2015 |

* cited by examiner

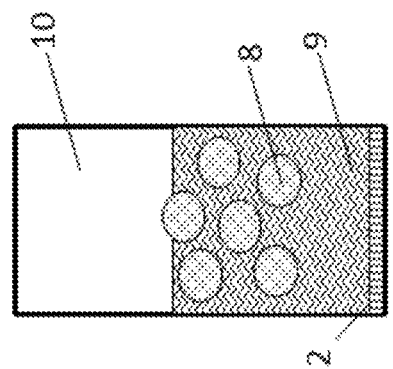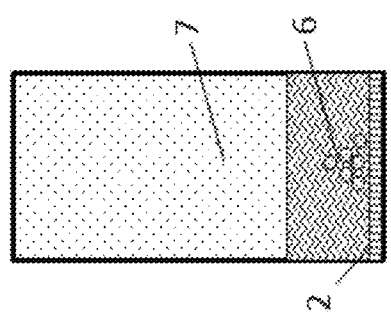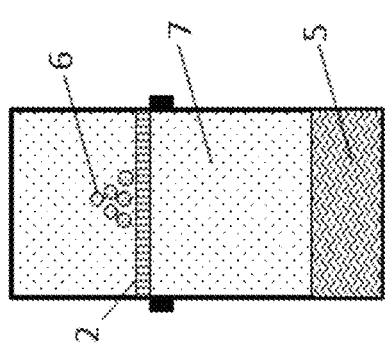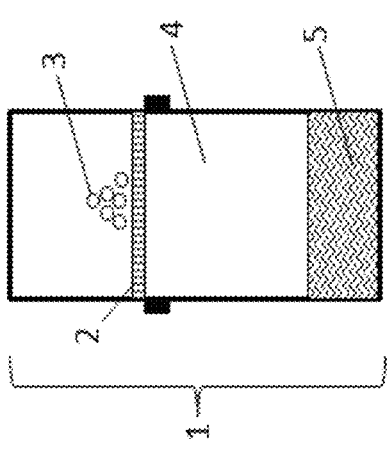
FIGURE 1

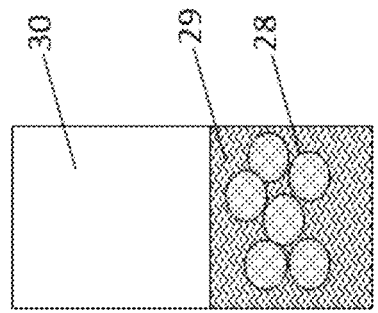
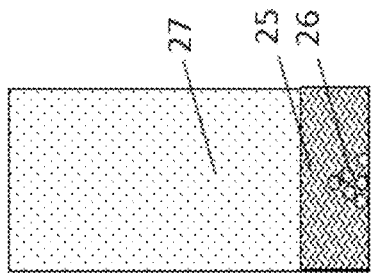
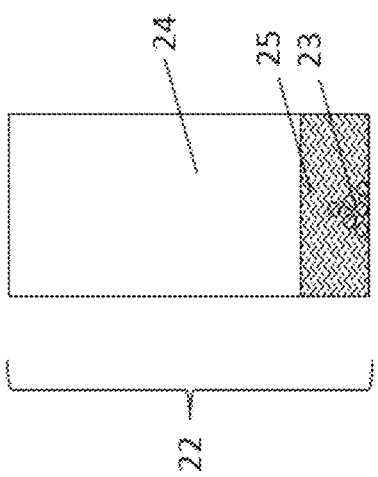
FIGURE 3 (PRIOR ART)

FIGURE 4
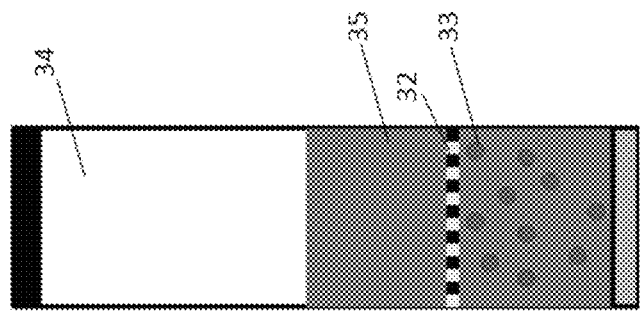
FIGURE 4C
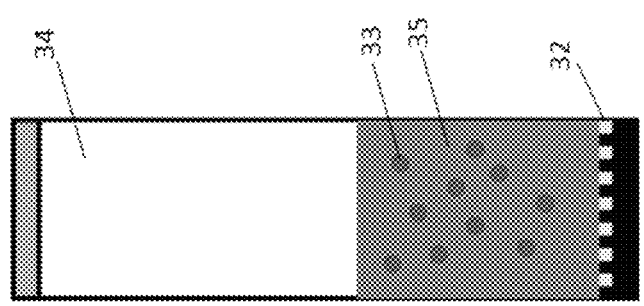
FIGURE 4B
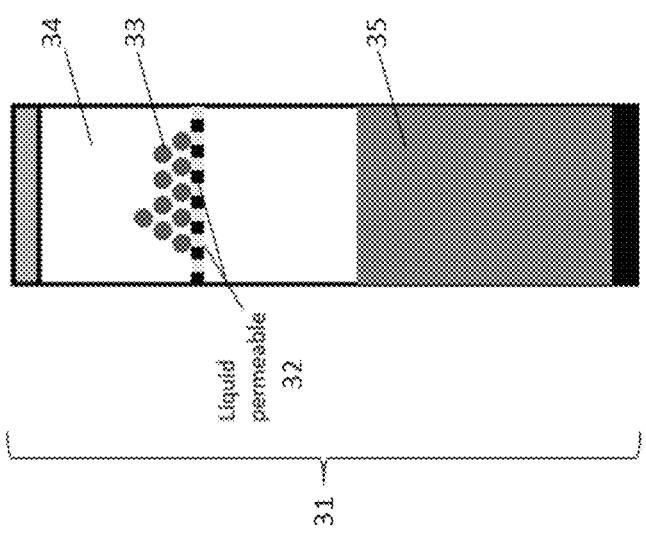
FIGURE 4A

US 11,186,695 B2

METHOD FOR PRODUCING EXPANDED THERMOPLASTIC POLYMERS

CROSS-REFERENCE TO RELATED APPLICATIONS

This application is the National Phase of International Application PCT/EP2017/079152 filed Nov. 14, 2017 which designated the U.S. and which claims priority to European App. Serial No. 16202626.4 Dec. 7, 2016. The noted applications are incorporated herein by reference.

FIELD OF INVENTION

The present invention relates to an improved and cost efficient method for making expanded (foamed) thermoplastic polymers (eTP) starting from non-expanded thermoplastic polymers (TP).

The invention further relates to a method for forming expanded thermoplastic polyurethane (eTPU) beads or sheets starting from non-expanded thermoplastic polyurethane (TPU) pellets having an average diameter in the range 0.2 mm up to 10 mm or from non-expanded thermoplastic polyurethane (TPU) sheets.

The present invention further relates to eTP/eTPU and moulded products comprising said eTP/eTPU and use of said eTP/eTPU in for example footwear applications.

BACKGROUND OF THE INVENTION

Thermoplastic polyurethanes (TPU) are well-known, in particular, for their very high tensile and tear strength, high flexibility at low temperatures, extremely good abrasion and scratch resistance. TPU's are also known for their superior dynamic properties, in particular, very high rebound figures, low compression set and hysteresis loss. Expanded TPU (eTPU) not only preserves the excellent performance of its base material (non-expanded TPU) but on top of that also provides good shock-absorbing properties and therefore makes eTPU materials very attractive for use in highly demanding shock-absorbing materials such as the application in a shoe sole (especially in professional sport and running shoes).

To fabricate eTPU, more in particular eTPU beads, several foaming methods are known.

Several foaming methods use an autoclave (11) wherein first the non-expanded TPU particles are introduced and put under high pressure using gaseous fluids (17) in order to saturate the TPU particles (13) and then there is a depressurizing step to expand the TPU particles (13) and obtain eTPU particles (18). These methods however lack temperature control and the obtained eTPU particles (18) suffer from sticking and anisotropy issues. Examples using this method can be found in CN 1016122772, CN 104987525 and WO 2015052265 and are illustrated in FIG. 2A-2C.

As a further example U.S. 2014/275306 discloses molded articles made of a thermoplastic elastomer having areas of different density and a method of preparing the thermoplastic elastomers. The method in U.S.'306 comprises (a) preparing pellets of a thermoplastic elastomer having a first density by infusing the pellets with a supercritical fluid in a pressurized container, removing the pellets from the container and foaming the pellets by immersing the pellets in a heated fluid or irradiating the pellets with infrared or microwave radiation to make foamed pellets of a first density; (b) preparing pellets of the thermoplastic elastomer having a second density by infusing the pellets with a supercritical fluid in a pressurized container, removing the pellets from the container and foaming the pellets by immersing the pellets in a heated fluid or irradiating the pellets with infrared or microwave radiation to make foamed pellets of a second density different from the first density; (c) placing foamed pellets having the first density in a first area of a mold and placing foamed pellets having the second density in a second area of the mold and molding the pellets to form the molded article.

Other state of the art foaming methods use an autoclave (22) wherein the non-expanded TPU particles (23) are introduced and immersed in a liquid (25) from the liquid being either an organic liquid or an aqueous solution and while the TPU particles remain immersed in the liquid, gaseous fluids (27) are introduced in order to saturate the TPU particles. Then there is a depressurizing step to expand the saturated TPU particles (26) and to obtain eTPU particles (28). The efficiency of these methods depends on the choice of liquids. Use of liquids (e.g. with low gas permeability) will, even with stirring, require a longer charging period in comparison with charging in a gaseous environment. For certain blowing gases the permeability through the liquid may be too low to be commercially viable. Examples using this method can be found in WO 94/20568 and WO 2008/125250 and are illustrated in FIG. 3A-3C.

For all reasons above indicated there is a need to develop an improved foaming process to make eTPU starting from non-expanded TPU, thereby avoiding above mentioned drawbacks.

AIM OF THE INVENTION

It is a goal of the invention to develop an improved process for fabricating expanded thermoplastic polymers (eTP), preferably eTPU, starting from non-expanded TP (TPU) whereby said process has improved thermal control and uses preferably environmentally friendly foaming gasses.

It is a goal of the invention to develop an improved process for fabricating expanded thermoplastic polymers (eTP), preferably eTPU starting from non-expanded TP (TPU) thereby avoiding anisotropy and sticking of the eTP (eTPU) during the processing.

It is a further goal to develop an improved process for fabricating expanded thermoplastic polymers (eTP), preferably eTPU starting from non-expanded TP (TPU) thereby minimising the duration of the charging step.

It is a further goal to develop an improved process for fabricating expanded thermoplastic polymers (eTP), preferably eTPU starting from non-expanded TP (TPU) and to incorporate pellet modifications during the charging step and/or after the submersion step.

It is a further goal to develop an improved process for fabricating expanded thermoplastic polyurethanes suitable for use in vibration and shock absorptive materials such as the use in highly demanding footwear.

SUMMARY OF THE INVENTION

According to a first aspect of the invention, a method for producing expanded thermoplastic polymeric (eTP) material is disclosed, said method comprising at least following steps:
Providing non-expanded thermoplastic polymer (TP) material, and then Placing the non-expanded TP in an autoclave, said autoclave being partly filled with a liquid and the material being not in contact with said liquid, and then Increasing the pressure in the autoclave by introducing at least one gaseous fluid at a temperature within the autoclave below the melting temperature of the thermoplastic polymer, and then Allowing the non-expanded TP material to reach a saturation state (charging step), and then Submerging the saturated TP material into the liquid (submersion step), and then Decreasing the pressure in the autoclave such that the submerged TP material expands to form eTP material (expansion step)

According to embodiments, the gaseous fluids used in the method according to the invention are selected from $N_2$ and/or $CO_2$.

According to embodiments, the gaseous fluids used in the method according to the invention may comprise low thermal conductivity gasses selected from Hydro Chloro Fluoro Carbons (HCFC's), Chloro Fluoro Carbons (CFC's), Hydro Chloro Fluoro Olefins (HCFO's), Hydro Fluoro Olefins (HFO's), (cyclo)-alkanes such as (cyclo)-pentane and/or noble gases such as krypton, argon and xenon.

According to embodiments, the liquid used in the method according to the invention in the autoclave may be reactive or non-reactive towards the thermoplastic polymer (TP).

According to embodiments, the liquid used in the method according to the invention in the autoclave may be non-reactive towards the thermoplastic polymer (TP).

According to embodiments, the liquid used in the method according to the invention in the autoclave may be a mixture comprising at least one liquid which is reactive towards the thermoplastic polymer (TP) and at least one liquid which is non-reactive towards the thermoplastic polymer (TP).

According to embodiments, the thermoplastic polymer (TP) may be reactive or made reactive towards the liquid in the autoclave.

According to embodiments, the gaseous fluids used in the method according to the invention in the autoclave may further comprise additives which are reactive towards the thermoplastic polymer (TP) and can result in modification of the thermoplastic polymer during the charging step.

According to embodiments, the liquid used in the method according to the invention in the autoclave may further comprise additives which are reactive towards the thermoplastic polymer (TP) and can result in modification of the thermoplastic polymer during the submersion step.

According to embodiments, the thermoplastic polymer (TP) material used in the method according to the invention is thermoplastic polyurethane (TPU), preferably TPU pellets having an average diameter in the range 0.2 to 10 mm, preferably in the range 0.5 to 5 mm.

According to embodiments, the step of increasing the pressure in the autoclave in the method according to the invention is such that the pressure within the autoclave is above the supercritical limits of the gaseous fluids, in the range 1-25 MPa and preferably in the range 5-25 MPa.

According to embodiments, the temperature within the autoclave in the method according to the invention is above the supercritical limits of the gaseous fluids and below the melting temperature of the thermoplastic material. Preferably temperatures in the range 30-250° C., more preferably in the range 30-190° C. are used.

According to embodiments, the step of allowing the thermoplastic polymer material to reach a saturation state in the method according to the invention is performed at controlled pressure and temperature within the autoclave until saturated thermoplastic polymer material is achieved.

Furthermore, according to a second aspect of the invention the expanded thermoplastic polymer material obtained according to the method of the invention is disclosed as well as the use of said material in vibration absorptive materials, packaging materials, automotive interiors, sporting goods, footwear and heat insulating materials is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

DEFINITIONS AND TERMS

In the context of the present invention the following terms have the following meaning:

1) The term "liquid", as used herein, refers to a fluid remaining in the liquid state of matter (flowing under shear, (nearly) incompressible) throughout the whole procedure. For a given liquid, this may set limitations to the accessible pressure and temperature range of the experiment. The liquid can be organic (such as for example glycerol), inorganic (such as for example water) or metallic (such as for example gallium).

2) The term "pellet", as used herein, refers to a non-expanded piece of material (e.g. spherical, ellipsoidal, polyhedral or cylindrical) having an average diameter in the range 0.2 mm up to 10 mm, preferably in the range 0.5 up to 5 mm. The term "bead", as used herein, refers to an expanded or foamed pellet having dimensions being 1.2 up to 100 times the size of the original pellet.

3) The term "sheet", as used herein, refers to a non-expanded piece of material, with one dimension significantly smaller than the other two, typically but not exclusively a rectangular cuboid (a further example could be a thin pre-shaped part like a shoe sole, or a thin polymer coating layer on a non expandable part) and wherein the smallest dimension falls in the range between 0.2 mm and to 100 mm. The term "expanded sheet", as used herein, refers to an expanded or foamed sheet having dimensions being 1.2 up to 100 times the size of the original sheet.

4) "Gaseous fluid" refers to the blowing agent or blowing agent mixture (e.g. $CO_2$) and a possible co-absorbed gas (e.g. $N_2$, present for its possible effect on material properties, nucleation rate.) in either gas or supercritical gas state of matter, depending on pressure and temperature conditions.

5) "Saturation" refers to the state where required amount of blowing agent has been dissolved into the pellet with only small internal concentration gradients remaining. The required dissolved amount largely depends on the final required density.

6) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

7) The term "thermoplastic" as used herein refers in its broad sense to designate a material that is reprocessable at an elevated temperature, whereas "thermoset" designates a material that exhibits high temperature stability without such reprocessability at elevated temperatures.

DETAILED DESCRIPTION

According to a first aspect of the invention, a process is disclosed for producing expanded thermoplastic polymeric material (eTP), said method comprising at least following steps:
  Providing non-expanded thermoplastic polymer (TP) material, and then
  Placing the non-expanded TP material in an autoclave, said autoclave being partly filled with a liquid and the material being not in contact with said liquid, and then
  Increasing the pressure in the autoclave by introducing at least one gaseous fluid, and then
  Allowing the non-expanded TP material to reach a saturation state (charging step), and then
  Submerging the saturated TP material into the liquid (submersion step), and then
  Decreasing the pressure in the autoclave such that the submerged TP material expand to form eTP material (expansion step)

According to embodiments, the non-expanded thermoplastic polymer (TP) material is in the form of pellets. Alternatively the non-expanded thermoplastic polymer (TP) material is in the form of a sheet.

According to embodiments, the submersion step mechanism, can be realised in several ways, for example but not limited to:
  a dropping mechanism (see FIG. 4B) with the non-expanded TP material lying on or in a holder (with openings smaller than the largest dimension of the non-expanded TP material) and whereby the holder is suspended above the liquid and is then dropped into the liquid;
  a rotation mechanism (see FIG. 4C), where by rotation of a vessel the non-expanded TP material (e.g. pellets), initially separated for example with a fixed grid or through vessel geometry (such as an inverted V-shape), falls into the liquid or vice versa the liquid gets poured over the non-expanded TP material (e.g. pellets).

The unifying feature of the submersion step mechanisms described above is the merging of the initially separated non-expanded TP material (e.g. pellets) with the liquid.

According to embodiments of the invention, the gaseous fluids may include but are not limited to $N_2$ and/or $CO_2$. Depending on the final application of the eTP material (e.g. beads) it may be desirable to include gasses having good thermal insulation properties such as Hydro Chloro Fluoro Carbons (HCFC's), Chloro Fluoro Carbons (CFC's Hydro Chloro Fluoro Olefins (HCFO's), Hydro Fluoro Olefins (HFO's), (cyclo)-alkanes such as (cyclo)-pentane and noble gases such as krypton, xenon and argon.

According to embodiments of the invention, the gaseous fluids and the liquid in the autoclave may be reactive (not limited to covalent bonding) or non-reactive towards the thermoplastic polymer (TP) or alternatively the TP material can be made reactive (e.g. by means of surface treatment) towards the liquid used.

According to embodiments of the invention, the gaseous fluids in the autoclave may further comprise additives which are reactive (not limited to covalent bonding) towards the thermoplastic polymer (TP) and which may result in modification of the thermoplastic polymer during the charging step. Typically these additives would aim to modify bulk properties, including for example colorants, fire retardants.

According to embodiments of the invention, the liquid in the autoclave further may comprise additives which are reactive (not limited to covalent bonding) towards the thermoplastic polymer (TP) and which may result in modification of the thermoplastic polymer during the submersion step. Typically these additives would aim to modify surface properties, including for example hydrophobic or hydrophylic compounds, radiation (e.g. UV) activatable additives, additives to avoid sticking of the eTP.

According to the invention, the thermoplastic polymeric (TP) material is thermoplastic polyurethane (TPU).

According to the invention, the thermoplastic polymeric material is thermoplastic polyurethane (TPU), preferably but not limited to the form of pellets or sheets which may be fabricated using an extruder. In the extruder, the TPU starting material is first melted to form a TPU polymer melt and subsequently cooled and cut into the desired shape such as but not limited to pellets, sheets, or any other form.

According to embodiments of the invention, the TP material is in the form of TP pellets (e.g. TPU pellets) whose preferred average diameter is from 0.2 to 10 mm, in particular from 0.5 to 5 mm and the submersion step may be realised by a dropping mechanism (see FIG. 4B) with the non-expanded TP pellets lying on or in a holder (with openings smaller than the largest dimension of the non-expanded TP pellets and whereby the holder is suspended above the liquid and is then dropped into the liquid.

According to the invention, the step of increasing the pressure in the autoclave and introducing at least one gaseous fluid is performed such that the pressure inside the autoclave lies between 1-25 MPa, preferably in the range 5-25 MPa (charging step). Typically the decrease in pressure (expansion step) is performed at a rate of several bar/second.

According to the invention, the step of increasing the pressure in the autoclave (charging step) by introducing gaseous fluid(s) is preferably performed until a pressure is reached in the range 1-25 MPa with a temperature in the range 30-250° C., more preferably in the range 5-25 MPa with a temperature in the range 30-190° C.

According to the invention, the step of increasing the pressure in the autoclave (charging step) is such that the pressure within the autoclave is preferably above the supercritical limits of the gaseous fluids (e.g. for $CO_2$ above 7.4 MPa, for nitrogen above 3.4 MPa).

According to the invention, the temperature within the autoclave is preferably above the supercritical limits of the gaseous fluids (e.g. for $CO_2$ above 30° C.) and the temperature within the autoclave is below the melting temperature of the thermoplastic material, this gives operating temperatures in the range 30-250° C.

According to the invention, the step of allowing the thermoplastic polymer material to reach a saturation state is performed at controlled pressure and temperature within the autoclave until blowing agent saturated thermoplastic polymeric material is achieved. This step typically can last from several minutes to several hours.

According to the invention, the saturated thermoplastic polymeric material is submerged into a liquid. As the environment pressure is dropped, the liquid acts as a barrier for any escaping gas from the saturated thermoplastic polymeric material. By submerging the saturated thermoplastic polymeric material in said liquid, there will be an increased thermal control as the liquid has better thermal energy transport properties than a gaseous environment. The presence of the liquid further reduces the contact between the expanded particles and thus reduces sticking significantly. The buoyancy force exerted by the liquid on the particles reduces contact intensity, allowing stirring of the beads.

According to embodiments, the liquid in the autoclave may be stirred such that the presence of dominant deformation orientations within the thermoplastic material is avoided or at least reduced (during foaming).

It is an aim of the invention to obtain expanded thermoplastic polymeric material (e.g. beads) which is less anisotropic, and whereby sticking of the expanded TP material (e.g. beads) is avoided or at least drastically reduced (compared to the process where the expansion step is in a gaseous fluid). The aim is achieved by splitting the fabrication process in two phases, namely a first step being the charging stage wherein the particles are saturated under high pressure with the gaseous fluid (e.g. supercritical $CO_2$ and/or $N_2$) and a second step being the expansion (foaming) stage during which the material (e.g. pellets) is submerged in a liquid. The step of submerging the saturated TP material (pellets) into the liquid before decreasing the pressure is crucial. The liquid will act as a barrier to avoid escape of absorbed gasses in the saturated TP from the material (pellets).

FIG. 1 illustrates an embodiment of the method according to the invention. FIG. 1A illustrates an autoclave (1) partly filled with a liquid (5) wherein non-expanded TP pellets (3) are introduced such that these pellets are not in contact with the liquid. FIG. 1B illustrates that while the non-expanded TP pellets (3) and liquid remain separate, the pressure in the autoclave is increased as at least one gaseous fluid (7) is introduced into the autoclave and the non-expanded TP pellets (3) will be saturated with the gaseous fluid(s) such that saturated TP polymer pellets (6) can be created. FIG. 1C illustrates that the horizontal holder or plate is then moved towards the liquid such that the non-expanded TP saturated pellets (6) are immersed in the liquid (5). FIG. 1D illustrates the expansion step wherein the pressure with the autoclave is reduced (depressurizing step to achieve foaming) and the saturated TP pellets expand to form expanded TP beads (8).

FIG. 4 illustrates different embodiments according to the invention to perform the submersion step. FIG. 4A illustrates an autoclave (31) partly filled with a liquid (35) wherein non-expanded TP pellets (33) are introduced such that these pellets are not in contact with the liquid. FIG. 4B illustrates the dropping mechanism wherein the horizontal holder (32) (which is liquid permeable) is moved towards the liquid such that the non-expanded TP saturated pellets (36) are immersed in the liquid (35). FIG. 4C illustrates the rotation mechanism wherein the autoclave reactor itself is rotated such that the liquid is able to go through the horizontal holder (32) and the non-expanded TP saturated pellets (36) are immersed in the liquid (35).

According to preferred embodiments, the TP polymer material is TPU polymer material (such as eTPU beads and eTPU sheets). TPU and processes for their production are well known. By way of example, TPUs can be produced via reaction of (a) one or more polyfunctional isocyanates with (b) one or more compounds reactive toward isocyanates having a molecular weight in the range of from 500 to 500,000 and, if appropriate, (c) chain extenders having a molecular weight in the range of from 50 to 499, and if appropriate in the presence of (d) catalysts and/or of (e) conventional auxiliaries and/or conventional additives.

The one or more polyfunctional isocyanates used for forming the TPU suitable for making the eTPU material (such as eTPU beads and eTPU sheets) used in the process according to the invention may be well-known aliphatic, cycloaliphatic, araliphatic, and/or aromatic isocyanates, preferably diisocyanates. For example tri-, tetra-, penta-, hexa-, hepta- and/or octamethylene diisocyanate, 2-methylpentamethylene 1,5-diisocyanate, 2-ethylbutylene 1,4-diisocyanate, 1,5-pentamethylene diisocyanate, 1,4-butylene diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, 2,2'-, 2,4'- and/or 4,4'-diphenylmethane diisocyanate (MDI), naphthylene 1,5-diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate, and/or phenylene diisocyanate.

The one or more polyfunctional isocyanates used for forming the TPU suitable for making the eTPU material (such as eTPU beads and eTPU sheets) used in the process according to the invention may consist essentially of pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyfunctional isocyanates are those containing at least 80% by weight of 4,4'-diphenylmethane diisocyanate. More preferably, the 4,4'-diphenylmethane diisocyanate content is at least 90, and most preferably at least 95% by weight.

The one or more compounds reactive toward isocyanates used for forming the TPU suitable for making the eTPU (such as eTPU beads and eTPU sheets) used in the process according to the invention may have a molecular weight of between 500 and 500,000 and may be selected from polyesteramides, polythioethers, polycarbonates, polyacetals, polyolefins, polysiloxanes and, especially, polyesters and polyethers or mixtures thereof.

The one or more compounds reactive toward isocyanates used for forming the TPU suitable for making the eTPU (such as eTPU beads and eTPU sheets) used in the process according to the invention are preferably diols, such as polyether diols and may include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

The one or more compounds reactive toward isocyanates used for forming the TPU material suitable for making the eTPU (such as eTPU beads and eTPU sheets) used in the process according to the invention are preferably diols, such as polyester and may include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their ester forming derivatives, for example succinic, glutaric and adipic acids or their dimethyl esters, sebacic acid, phthalic anhydride, tetrachlorophthalic anhydride or dimethyl terephthalate or mixtures thereof. Polycapro lactones and unsaturated polyesterpolyols should also be considered.

Suitable low molecular weight (generally below 400) difunctional compounds that serve as chain extenders used for forming the TPU suitable for making the eTPU material (such as eTPU beads and eTPU sheets) used in the process according to the invention may include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butyl enediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Di-esters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable. Preferably the reaction mixture does not contain any low molecular weight triol.

Other conventional ingredients (additives and/or auxiliaries) may be used for forming the TPU material suitable for making the eTPU material (such as eTPU beads and eTPU sheets) used in the process according to the invention. These include catalysts, surfactants, flame proofing agents, fillers, pigments (to provide different colors), stabilizers and the like. Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine.

The reactants used forming the TPU material suitable for making the eTPU material (such as eTPU beads and eTPU sheets) used in the process according to the invention may be applied using the so-called one-shot, semi-prepolymer or prepolymer method known in the art by a batch or continuous process known to the person skilled in the art. The TPU's thus produced are dissolved into a reactive diluent, and can be processed according to known techniques. All reactants can be reacted at once, or can be reacted in a sequential manner into the reactive diluent. The various components used can in fact be added in any order.

For example, one may use a prepolymer of polyisocyanate and polyol, then add the diol and the monool, or one may use a prepolymer of polyisocyanate and polyol and the monool, then add the diol in the process for forming the TPU suitable for making the eTPU particles used in the process according to the invention.

According to a second aspect of the invention, the expanded thermoplastic polymeric material obtained using the method of the invention is disclosed as well as the use of said material.

The eTPU (such as eTPU beads and eTPU sheets) according to the invention may be widely applied in the fields of vibration-absorptive materials, packaging materials, toys for children, sporting goods, aviation models, heat insulating materials, automotive interior materials.

FIGURES

FIG. 1 illustrates the autoclave set up and process steps to achieve expanded polymer particles according to the invention.

FIG. 3 illustrates the autoclave set up and process steps to achieve expanded polymer particles according to a state of the art process.

FIG. 4 illustrates a few embodiments according to the invention to perform the submersion step. FIG. 4B illustrates the dropping mechanism; FIG. 4C illustrates a rotation mechanism.

Figure 2:
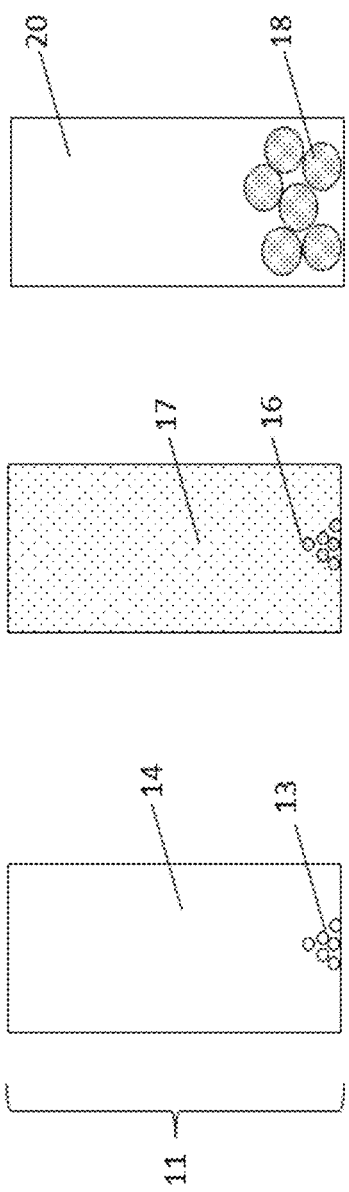
FIG. 2 illustrates the autoclave set up and process steps to achieve expanded polymer particles according to a state of the art process.
Figure 5A:
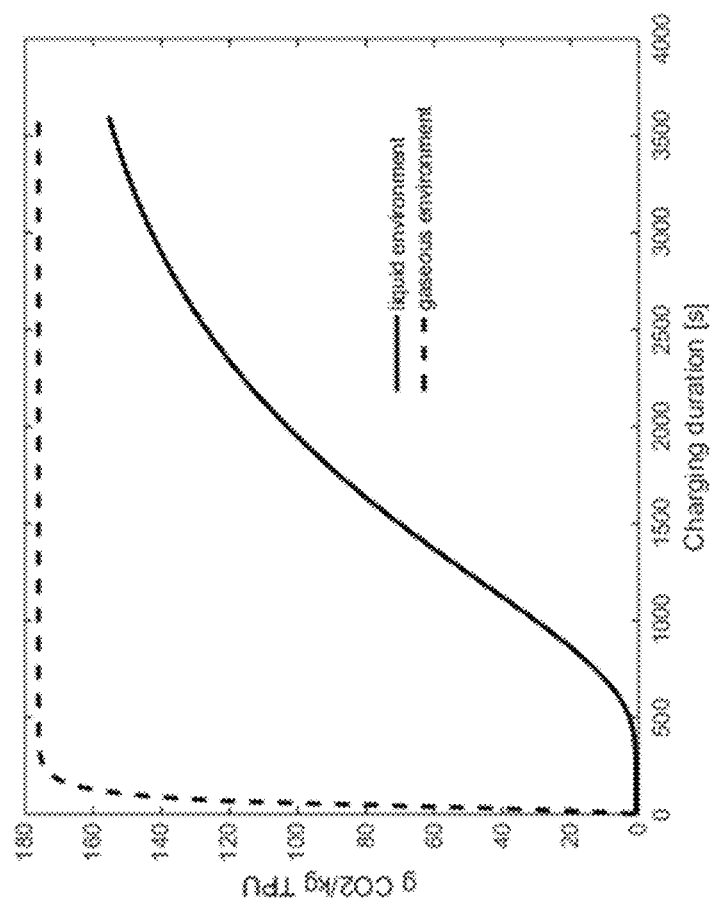
Figure 5B:
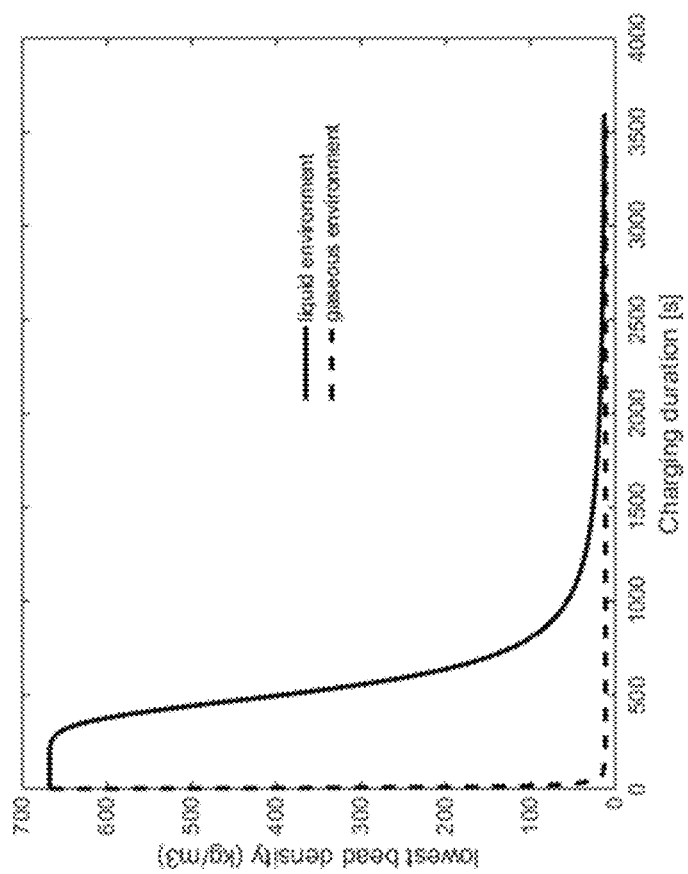

FIG. 5 illustrates the charging step (simulations according to example 1 of the invention) in a liquid and in a gaseous environment. FIG. 5A illustrates the amount of $CO_2$ absorbed in the TPU pellets (g $CO_2$/kg TPU) as a function of charging duration. FIG. 5B illustrates the density of the TPU beads (kg/m$^3$) as a function of charging duration.

Figure 6A:
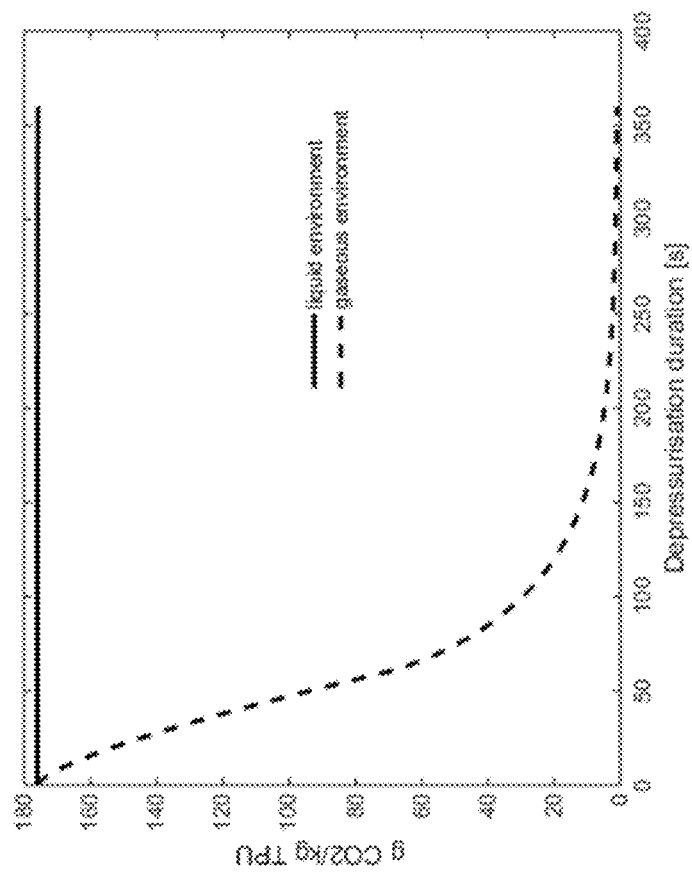
Figure 6B:
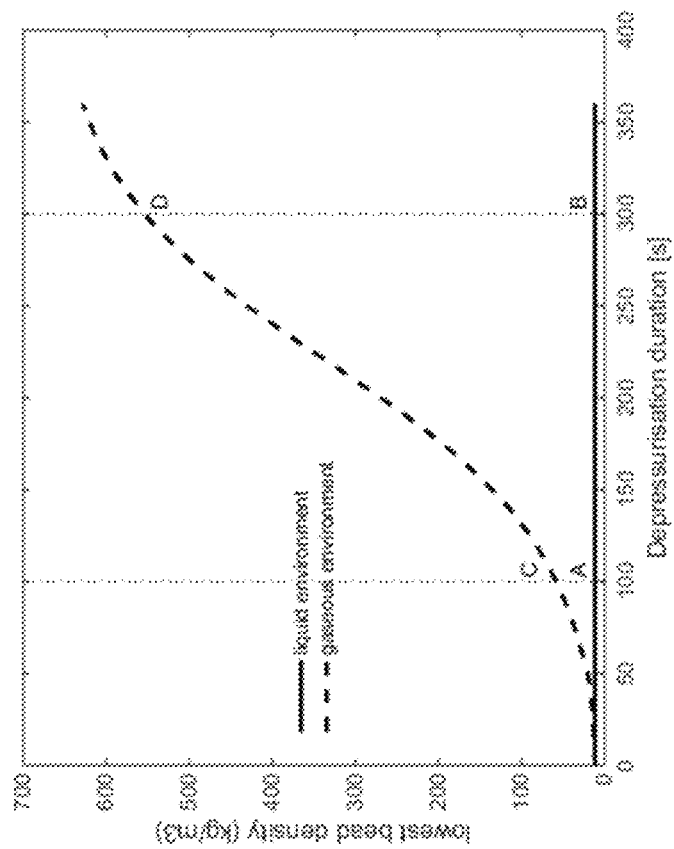
Figure 6C:
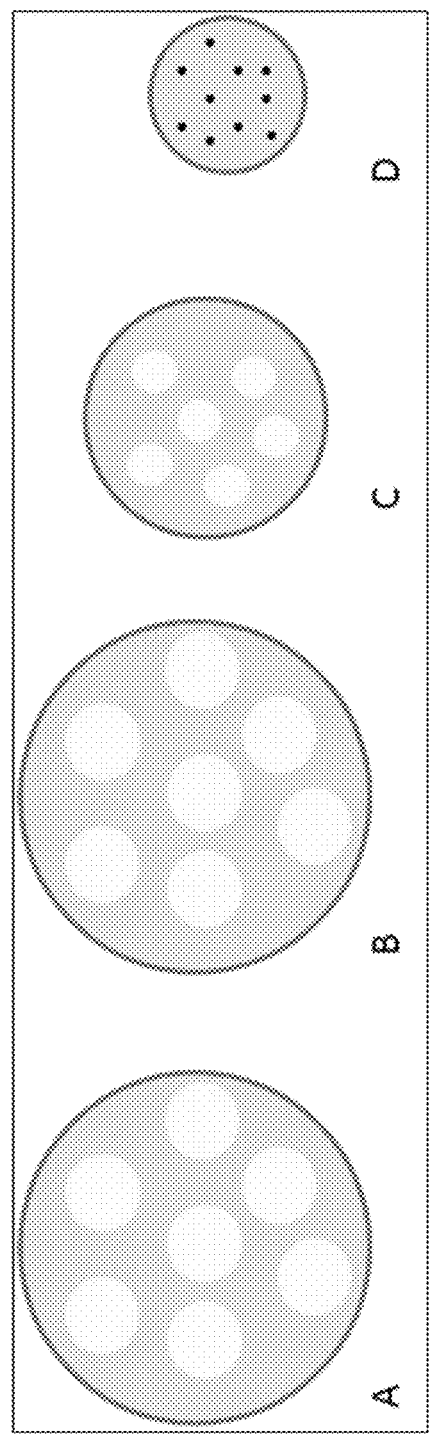

FIG. 6 illustrates the expansion step (simulations according to example 1 of the invention) in a liquid and in a gaseous environment. FIG. 6A illustrates the amount of $CO_2$ absorbed in the TPU pellets (g $CO_2$/kg TPU) as a function of depressurisation duration. FIG. 6B illustrates the density of the TPU beads (kg/m$^3$) as a function of depressurisation duration. FIG. 6C illustrates the different characteristics of the TPU material (beads) after the expansion step simulations in a liquid (A,B) or in a gaseous (C,D) environment, assuming a fast (A,C) or slow process (B,D). The corresponding points have also been indicated in FIGS. 6A and 6B.

Figure 7A:
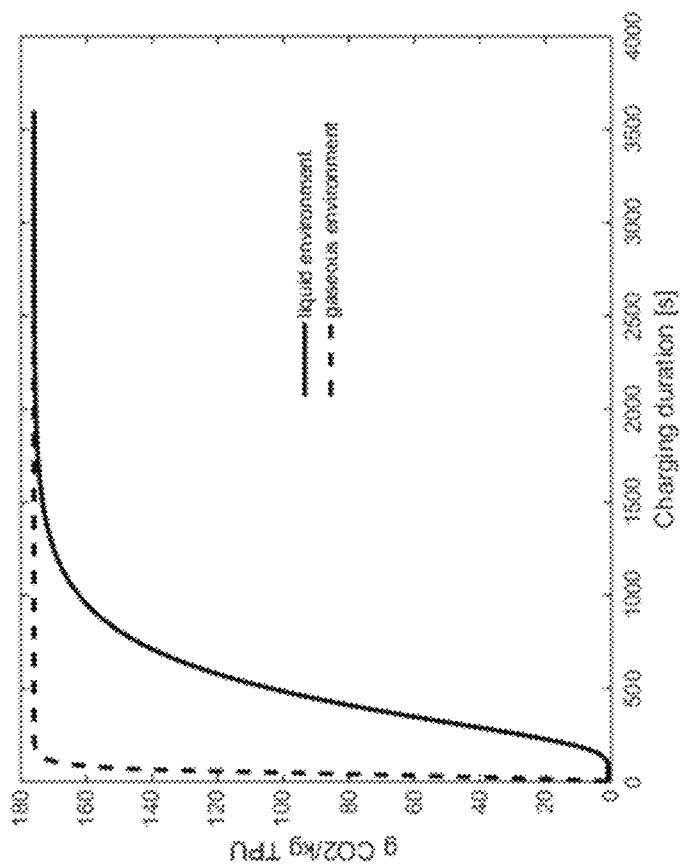
Figure 7B:
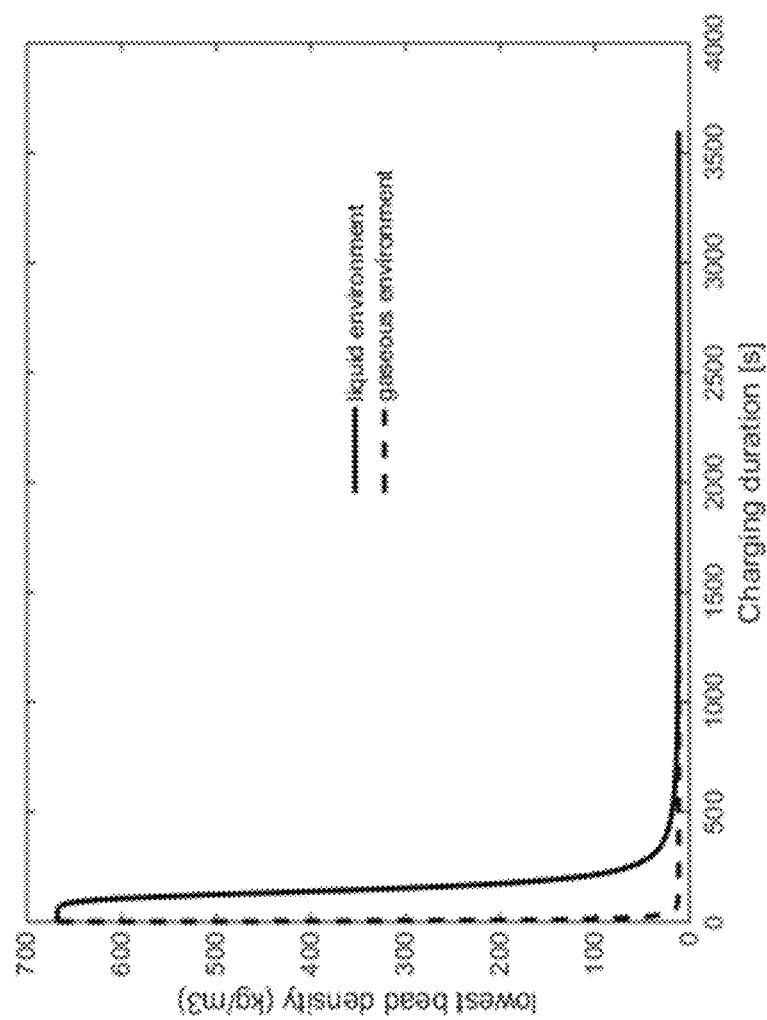

FIG. 7 illustrates the charging step (simulations according to example 2 of the invention) in a liquid and in a gaseous environment. FIG. 7A illustrates the amount of $CO_2$ absorbed in the TPU pellets (g $CO_2$/kg TPU) as a function of charging duration. FIG. 7B illustrates the density of the TPU beads (kg/m$^3$) as a function of charging duration.

Figure 8A:
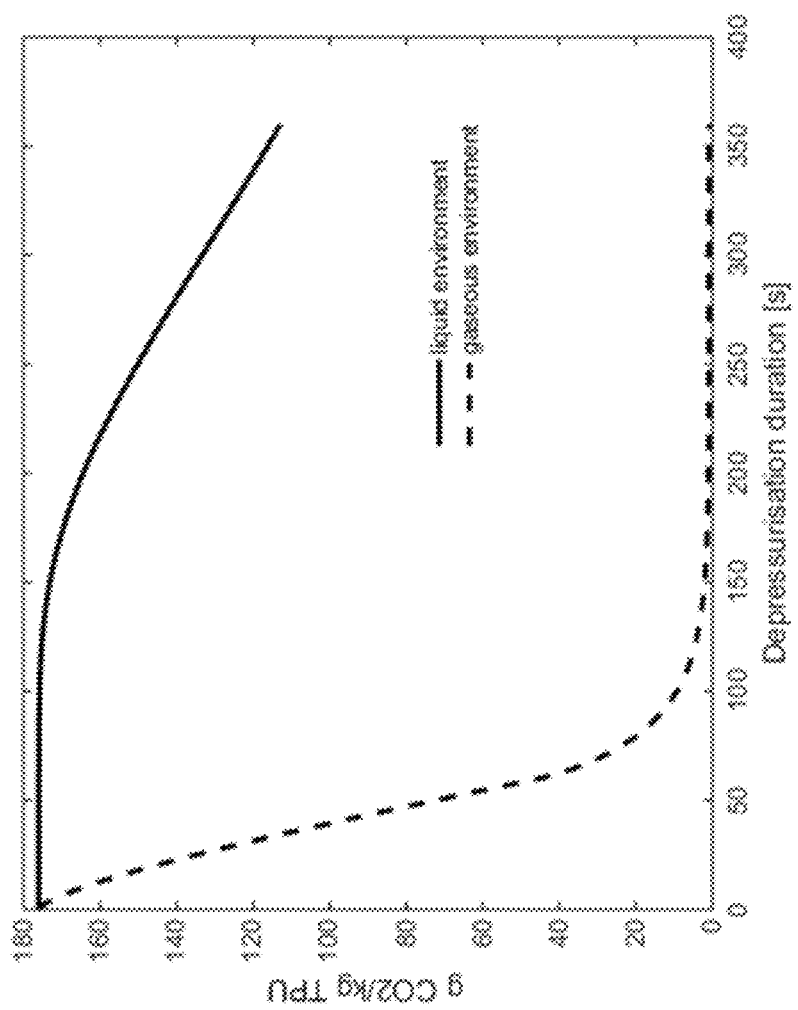
Figure 8B:
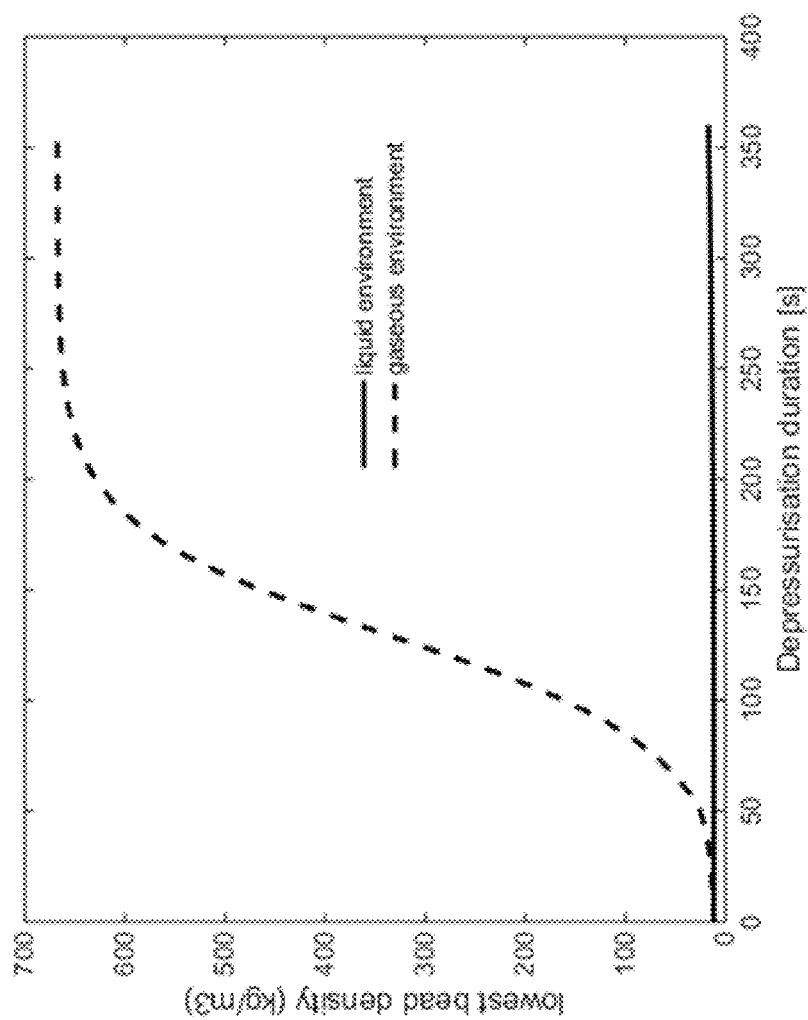

FIG. 8 illustrates the expansion step (simulations according to example 2 of the invention) in a liquid and in a gaseous environment. FIG. 8A illustrates the amount of $CO_2$ absorbed in the TPU pellets (g $CO_2$/kg TPU) as a function of depressurisation duration. FIG. 8B illustrates the density of the TPU beads (kg/m') as a function of depressurisation duration.

Figure 9A:
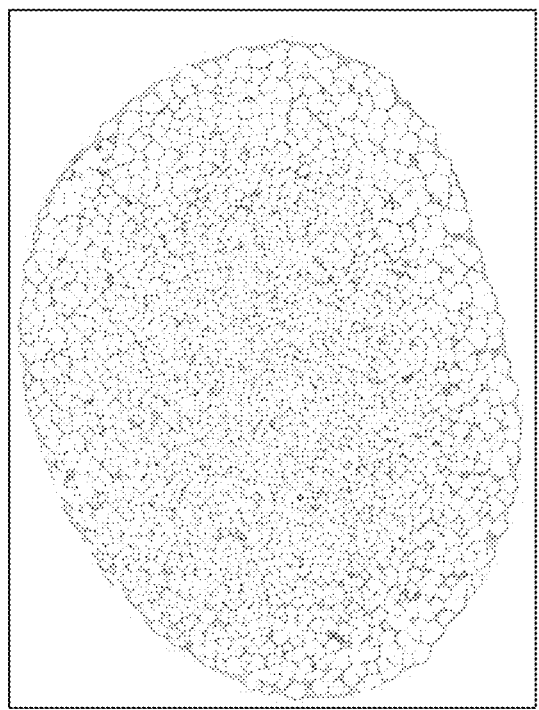
Figure 9B:
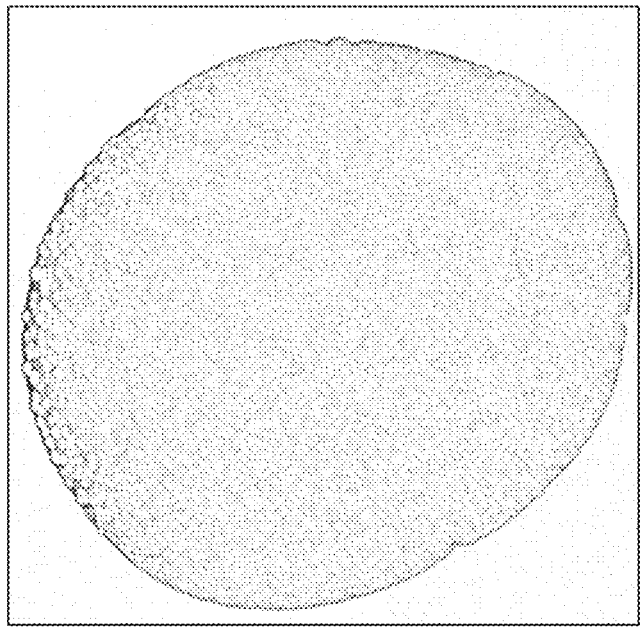
Figure 9C:
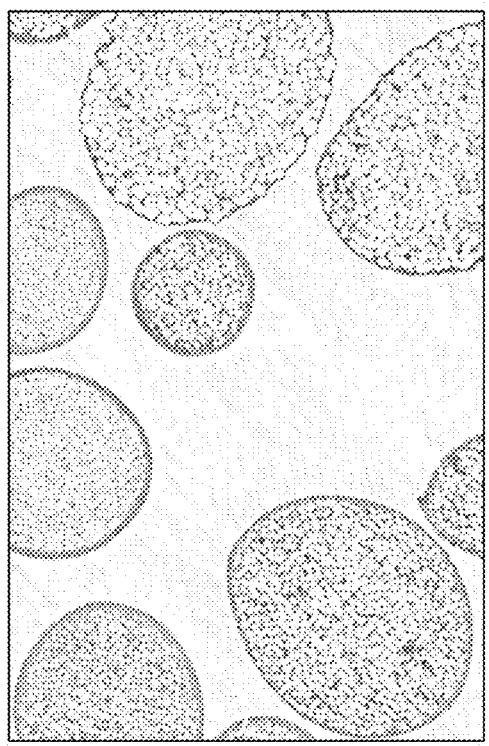

FIGS. 9A, 9B and 9C: Cross sections of eTPU beads blown according to the invention (obtained through CT-imaging).

EXAMPLES

Simulation examples: illustrating the gas absorption during the charging step and the diffusive leakage during the expansion step (simulations), comparing the effects of a liquid and a gaseous environment.

The numerical experimental setup is a diffusion simulation in a spherical domain of a TPU pellet with a radius of 1 mm surrounded by a liquid layer with a thickness of 5 mm. There is no mixing, no polymer swelling, no nucleation, temperature is held constant, material properties are independent of pressure and dissolved concentration.

Example 1

Input: diffusivity in TPU: $2 \cdot 10^{-9}$ m$^2$/s, diffusivity in liquid: $3 \cdot 10^{-9}$ m$^2$/s, solubility in TPU: $2 \cdot 10^{-4}$ mol/m$^3$ Pa, solubility in liquid: $10^{-4}$ mol/m$^3$ Pa).

The charging step simulation (FIG. 5) starts from a TPU pellet in equilibrium with a $10^5$ Pa $CO_2$ atmosphere, after which the pressure is ramped up to $2 \cdot 10^7$ Pa $CO_2$. The expansion step simulation (FIG. 6) starts from a TPU pellet in equilibrium with a $2 \cdot 10^7$ Pa $CO_2$ atmosphere, after which the pressure is dropped to $10^5$ Pa $CO_2$.

It is shown that the volume averaged $CO_2$ content (FIG. 5A+6A) in the pellet is much more volatile in the gaseous environment (dashed lines) while its evolution in a liquid environment (full lines) is much slower.

A lower limit for the final bead density (FIG. 5B+6B), which is a measure of bead quality can be derived from $CO_2$ content—the higher the content at the capture point, the lower the final density can be. For the minimal achievable density calculations, it was assumed that after the indicated charging/depressurization duration all remaining $CO_2$ content is captured and fully converted into bubble filling gas (this excludes further escape of gas, condensation or any gas remaining in the matrix).

Conclusion: the method according to the invention selects the faster charging environment (FIG. 5), i.e. in a gaseous fluid, and the depressurization environment that gives the lowest potential density (FIG. 6), i.e. in a liquid.

Example 2

(Using More Permeable TPU Material)

Input: diffusivity in TPU: $4 \cdot 10^{-9}$ m$^2$/s, diffusivity in liquid: $12 \cdot 10^{-9}$ m$^2$/s, solubility in TPU: $2 \cdot 10^{-4}$ mol/m$^3$ Pa, solubility in liquid: $10^{-4}$ mol/m$^3$ Pa).

The charging step simulation (FIG. 7) starts from a TPU pellet in equilibrium with a $10^5$ Pa $CO_2$ atmosphere, after which the pressure is ramped up to $2 \cdot 10^7$ Pa $CO_2$. The expansion step simulation (FIG. 8) starts from a TPU pellet in equilibrium with a $2 \cdot 10^7$ Pa $CO_2$ atmosphere, after which the pressure is dropped to $10^5$ Pa $CO_2$.

It is also here shown that the volume averaged $CO_2$ content (FIG. 7A+8A) in the pellet is much more volatile in the gaseous environment (dashed lines) while its evolution in a liquid environment (full lines) is much slower.

A lower limit for the final bead density (FIG. 7B+8B), which is a measure of bead quality can be derived from $CO_2$ content—the higher the content at the capture point, the lower the final density can be. For the minimal achievable density calculations, it was also here assumed that after the indicated charging/depressurization duration all remaining $CO_2$ content is captured and fully converted into bubble filling gas (this excludes further escape of gas, condensation or any gas remaining in the matrix).

A similar conclusion can be drawn here: the method according to the invention selects the faster charging environment (FIG. 7), i.e. in a gaseous fluid, and the depressurization environment that gives the lowest potential density (FIG. 8), i.e. in a liquid.

Experimental examples: illustrating the process according to the invention and the obtained expanded thermoplastic (polyurethane) beads.

Three experiments were performed illustrating and confirming the process according to the invention.

Two sizes of largely spherical TPU pellets were used:
1. 'regular' pellets with a diameter between 2 and 3 mm (used in experiment A and B), and
2. 'micropellets' with a diameter approximately between 0.2 and 0.3 mm (used in experiment C).

For all 3 experiments, two connected (valve separation) cylindrical containers (1 liter) were heated to 130° C. One container was filled with water and pressurized (towards 145 bar $CO_2$ for experiment A and towards 250 bar $CO_2$ for experiment B & C).

The other container was loaded with approximately 30 g of pellets/micropellets and charged to the same pressure.

The vessels were kept for 30 minutes (for experiment A and B)/15 minutes (for experiment C) under these conditions to allow pellet saturation.

Subsequently water was transferred to the pellet containing vessel during 1 minute (for experiment A and B)/16 minutes (for experiment C).

In experiment A and C a better $CO_2$ saturation degree of the water was achieved by adding the water in a thin stream over a longer period while exposed to high pressure $CO_2$. This did not compromise pellet $CO_2$ saturation as the micropellets are smaller and thus reach saturation faster than the regular pellets. The overall experiment duration was kept the same to have a comparable thermal history.

Finally, in all 3 experiments, the pressure was released on a timescale of about 5 s, causing bubble nucleation and expansion.

In FIG. 9, CT-analysis images of the results of each experiment are included (black is solid fraction).

FIGS. 9A and 9B illustrate expanded thermoplastic beads originating from 'regular' pellets with a diameter between 2 and 3 mm (used in experiment A and B).

FIG. 9C illustrates expanded thermoplastic beads originating from 'micropellets' with a diameter approximately between 0.2 and 0.3 mm (used in experiment C).

The invention claimed is:

1. A method for producing expanded thermoplastic polymeric material, said method comprising at least following steps:
   a) placing a non-expanded thermoplastic polymer material in an autoclave, said autoclave being partly filled with a liquid and wherein the non-expanded thermoplastic polymer material not being in contact with said liquid;
   b) increasing the pressure in the autoclave by introducing at least one gaseous fluid at a temperature within the autoclave below the melting temperature of the non-expanded thermoplastic polymer material;
   c) allowing the non-expanded thermoplastic polymer material to reach a saturation state; thereby forming a saturated non-expanded thermoplastic material
   d) submerging the saturated non-expanded thermoplastic material into the liquid, and then
   e) decreasing the pressure in the autoclave such that the submerged saturated non-expanded thermoplastic polymer material expands to form the expanded thermoplastic polymer material.

2. The method according to claim 1, wherein the gaseous fluids are selected from $N_2$ and/or $CO_2$.

3. The method according to claim 1, wherein the gaseous fluids comprise low thermal conductivity gases selected from Hydro Chloro Fluoro Carbons (HCFC's), Chloro Fluoro Carbons (CFC's), Hydro Chloro Fluoro Olefins (HCFO's), Hydro Fluoro Olefins (HFO's), (cyclo)-alkanes.

4. The method according to claim 1, wherein the liquid in the autoclave is reactive or non-reactive towards the non-expanded thermoplastic polymer material.

5. The method according to claim 1, wherein the non-expanded thermoplastic polymer material is reactive or made reactive towards the liquid in the autoclave.

6. The method according to claim 1, wherein the gaseous fluids in the autoclave further comprise additives which are reactive towards the non-expanded thermoplastic polymer material and can result in modification of the thermoplastic polymer during the charging step.

7. The method according to claim 1, wherein the liquid in the autoclave further comprises additives which are reactive towards the non-expanded thermoplastic polymer material and can result in modification of the non-expanded thermoplastic polymer material during step (d).

8. The method according to claim 1, wherein the thermoplastic polymer material is a thermoplastic polyurethane material.

9. The method according to claim 1, wherein the non-expanded thermoplastic polymer material is a thermoplastic polyurethane pellet having an average diameter in the range 0.2 to 10 mm.

10. The method according to claim 1, wherein the non-expanded thermoplastic polymer thermoplastic polymer material is a thermoplastic polyurethane pellet having an average diameter in the range 0.5 to 5 mm.

11. The method according to claim 1, wherein in step (b) the pressure within the autoclave is above the supercritical limits of the gaseous fluids.

12. The method according to claim 1, wherein the pressure within the autoclave ranges from 1-25 MPa in step (b).

13. The method according to claim 1, wherein the temperature within the autoclave is above the supercritical limits of the gaseous fluids and below the melting temperature of the thermoplastic material.

14. The method according to claim 1, wherein the temperature within the autoclave ranges from 30-250° C.

15. The method according to claim 1, wherein step (c) is performed at controlled pressure and temperature within the autoclave until saturated non-expanded thermoplastic polymer material is achieved.

* * * * *